United States Patent [19]

Matsui et al.

[11] Patent Number: 4,583,701
[45] Date of Patent: Apr. 22, 1986

[54] WEBBING RETRACTOR

[75] Inventors: Kenji Matsui; Fuminori Teraoka, both of Aichi, Japan

[73] Assignee: Kabushiki Kaisha Toka-Rika-Denki-Seisakusho, Aichi, Japan

[21] Appl. No.: 550,249

[22] Filed: Nov. 9, 1983

[30] Foreign Application Priority Data

Nov. 15, 1982 [JP] Japan .................... 57-172449[U]

[51] Int. Cl.[4] .................... A62B 35/02; B65H 75/48
[52] U.S. Cl. .................... 242/107.4 A; 242/107.4 R
[58] Field of Search ............... 242/107.4 A, 107.4 B, 242/107.4 D, 107.7; 280/806; 297/478

[56] References Cited

U.S. PATENT DOCUMENTS

| | | | |
|---|---|---|---|
| 3,598,336 | 8/1971 | Frost | 242/107.4 D |
| 3,858,826 | 1/1975 | Sprecher | 242/107.7 |
| 3,897,913 | 8/1975 | Hall | 242/107.4 A |
| 3,999,723 | 12/1976 | Magyar | 242/107.4 D X |
| 4,436,255 | 3/1984 | Matsui et al. | 242/107.4 A |

Primary Examiner—Stuart S. Levy
Assistant Examiner—Katherine Jaekel
Attorney, Agent, or Firm—Sixbey, Friedman & Leedom

[57] ABSTRACT

In a webbing retractor used in a seatbelt system for protecting an occupant in an emergency situation of a vehicle, a first guide portion of a cam ring is opposed to a transmitting means to thereby put a locking means in an engageable condition until a webbing is unwound up to a first predetermined amount, an acceleration sensor puts the locking means in an engaged condition to stop a webbing-unwinding rotation of a takeup shaft only in the emergency situation of the vehicle, a second guide portion of the cam ring is opposed to the transmitting means to thereby bias the locking means in the engaged condition when the webbing is unwound in an amount of more than the first predetermined amount, and, thereafter, an automatic locking mechanism is worked when the occupant, a fixture such as a child seat or the like is embraced by the webbing, so that the occupant, the fixture or the like is restrained surely.

20 Claims, 11 Drawing Figures

WEBBING RETRACTOR

BACKGROUND OF THE INVENTION

1. Field of the Invention

The present invention relates to a webbing retractor used in a seatbelt system for protecting an occupant to prevent an occupant-restraining webbing from being unwound in an emergency situation of a vehicle.

2. Description of the Prior Art

The webbing retractor, applied to the seatbelt system for protecting the occupant of the vehicle to wind the end portion of the occupant restraining webbing, is constructed so as to wind the webbing by a biasing force and store it therein.

Among such webbing retractors, in a webbing retractor provided with an automatic locking mechanism for automatically stopping an additional unwinding of the webbing after the occupant wears the webbing, so-called Automatic Locking Retractor (ALR), the occupant is restrained so securely by the webbing, so that is difficult for him to make comfort changing movements while seated in such restrained position.

Also, in a webbing retractor provided with an emergency locking mechanism for stopping the unwinding of the webbing when an emergency situation of the vehicle is detected by an acceleration sensor, so-called Emergency Locking Retractor (ELR), the occupant can change his attitude easily in the ordinary running situation of the vehicle but, in case that a fixture such as a child seat or the like is fixed to a vehicle seat of the vehicle by the webbing, it is moved sometimes. That is to say, the webbing is unwound unnecessarily from the webbing retractor by vibrations or the like caused due to a low acceleration range where the acceleration sensor is not worked or the movement of the child received in the child seat, so that the child seat is moved on the vehicle seat. In addition, the ELR provided with a manual locking mechanism for manually locking the emergency locking mechanism to stop the webbing unwinding rotation of the takeup shaft at need has been proposed in this field. However, such a manual locking mechanism is generally mounted on the webbing retractor as an optional member and, therefore, an operation lever for the manual locking mechanism must be arranged in a confined space where the lever is difficult to be operated, for example, under the seat, whereby the operation of the lever is complicated. Also, in order to remote-control the manual locking mechanism such a connecting means as a wire must be arranged in the vehicle body.

SUMMARY OF THE INVENTION

In view of the above-described facts, the present invention has as its object the provision of a webbing retractor which is able to be used as an ALR or an ELR at need.

In a webbing retractor according to the present invention, a first guide portion of a cam ring is opposed to a transmitting means to thereby put a locking means in its engageable condition until a webbing is unwound up to its first predetermined amount, the locking means is put in its engaged condition an action of an acceleration sensor to stop an webbing unwinding rotation of the takeup shaft only in an emergency situation of a vehicle, a second guide portion of the cam ring is opposed to the transmitting means to thereby bias the locking means into its engaged condition when the webbing is unwound in an amount of more than the first predetermined amount, and, thereafter, an automatic webbing-unwinding action is stopped when the webbing is worn, whereby an occupant, a seat mounted fixture or the like encircled by the webbing is restrained securely.

Description will hereinunder be given of embodiments of the present invention with reference to the attached drawings.

DESCRIPTION OF THE PREFERRED EMBODIMENTS

Figure 1:
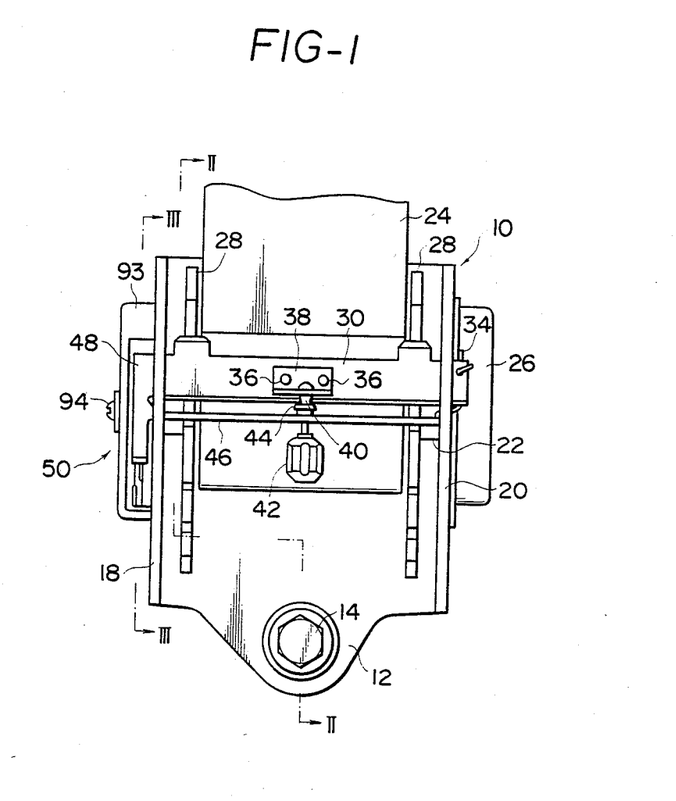
FIG. 1 is a front view of a first embodiment of a webbing retractor according to the present invention.
Figure 2:
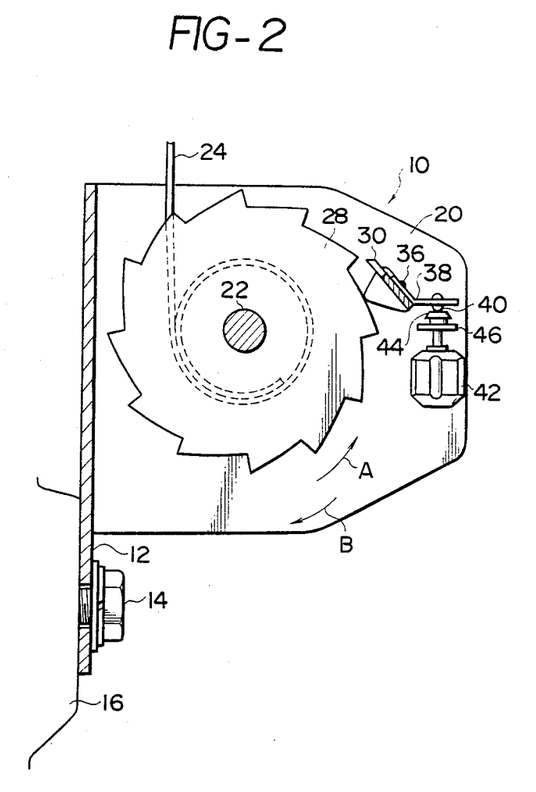
FIG. 2 is a sectional view taken along a line II—II of FIG. 1.
Figure 3:
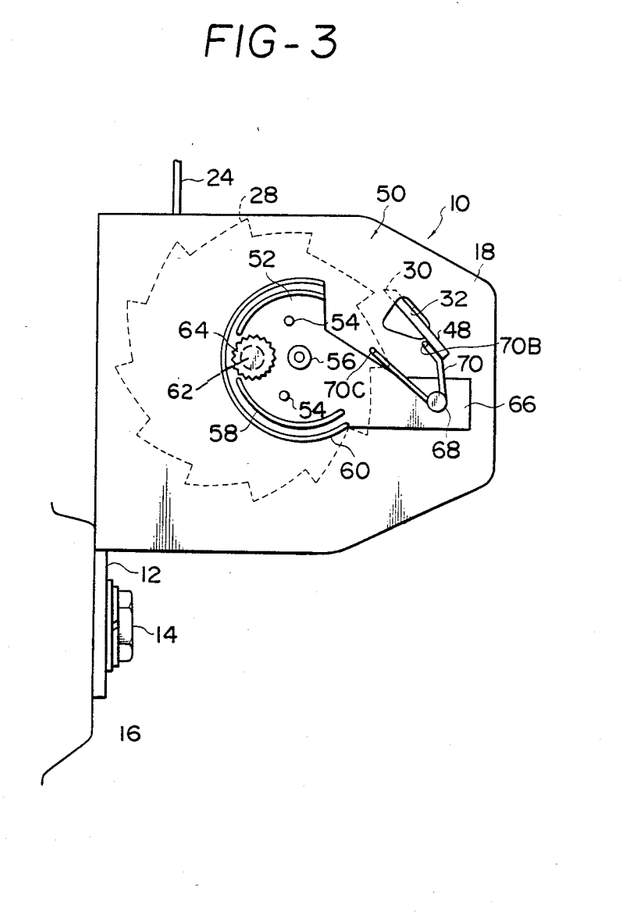
FIG. 3 is a sectional view taken along a line III—III of FIG. 1 in which a dust cover and a cam ring is removed.

As shown in FIGS. 1 to 3, a webbing retractor 10 according to a first embodiment of the present invention is fixed at its frame 12 to a vehicle body 16 through a mounting bolt 14.

A pair of leg plates 18, 20 extend from both the side portions of the frame 12 in parallel with each other and a takeup shaft 22 is supported at both end portions thereof to the leg plates 18, 20. One end of an occupant-restraining webbing 24 is wound, or retracted, in layer to an intermediate portion of the takeup shaft 22 and the other end thereof is fixed to another part of the vehicle body 16 through a tongue plate, buckle unit or the like, so that an occupant can wear the webbing 24.

An end portion of the takeup shaft 22 passes through the leg plate 20 and a spiral spring retracting unit 26 is confined between the end portion of the takeup shaft 22 and the leg plate 20, so that the takeup shaft 22 is biased in the winding, or retracting, direction of the webbing 24, i.e. in a direction of arrow A shown in FIG. 2.

Fixed to an intermediate portion of the takeup shaft 22 at both the side portions of the webbing 24 are a pair of ratchet wheels 28 which is rotatable together with the takeup shaft 22. Opposed to the ratchet wheels 28 is a pawl 30, and they constitute a locking means. The leg plates 18, 20 are formed with substantially triangular slots 32 through which both the end portions of the pawl 30 passes, and a wire spring 34 is confined between the leg plate 20 and the end portion of the pawl 30 passing through the leg plate 20, whereby the pawl 30 is biased in a direction of separation from the ratchet wheels 28, that is, the pawl 30 is kept in the situation shown in FIG. 2. When the pawl 30 is rotated against a biasing force of the wire spring 34, it comes into mesh with the ratchet wheels 28 to stop rotations of the ratchet wheels 28 and of the takeup shaft 22 in the unwinding direction of the webbing 24, i.e. in a direction of arrow B shown in FIG. 2.

The pawl 30 may be constituted so as to be biased in the direction of separation from the ratchet wheels 28 by its self-weight.

As shown in FIG. 2, fixed to an intermediate portion of the pawl 30 through rivets 36 is one end of a lever 38, the other end of which is formed with a projection 40 which is positioned on an upper face 44 of a pendulum 42. The pendulum 42 is suspended from a bracket 46 arranged across the leg plates 18, 22, so that the axial center of the pendulum 42 becomes perpendicular.

However, when an acceleration of the vehicle reaches a predetermined value, the pendulum 42 is inclined to push up the lever 38 and the pawl 30 is caused to mesh with the ratchet wheel 28 against the biasing force of the wire spring 34, whereby the webbing-unwinding rotation of the takeup shaft 22 is automatically stopped in the emergency situation of the vehicle. Thus, the pendulum 42 functions as an acceleration sensor.

In this connection, besides the pendulum 42, such an acceleration sensor as is rotatably moved due to an acceleration of the vehicle or such an acceleration sensor as detects an urgent webbing-unwinding rotation of the takeup shaft 22 to cause the pawl 30 to incline can also be applied to the present invention as an acceleration sensor.

One end portion of the pawl 30 passes through the leg plate 18, extends at a right angle to the longitudinal direction thereof and forms a force-receiving plate 48. The force-receiving plate 48 is opposed to a control mechanism 50 mounted on an outside of the leg plate 18. When the webbing 24 is unwound from the takeup shaft 22 in an amount of more than a predetermined amount, the control mechanism 50 biases the pawl 30 in the direction of the ratchet wheel 28 to thereby cause the webbing retractor 10 to function as an Automatic Locking Retractor (ALR), i.e. a webbing retractor provided with an automatic locking mechanism stopping an webbing-unwinding action automatically.

As shown in FIG. 3, fixed to the control mechanism 50 at the outside of the leg plate 18 through a plurality of rivets 54 is a guide plate 52. The guide plate 52 is formed with an inner wall 58 of a substantial ⅔ arc and an outer wall 60 thereof centering around a boss portion 56 coaxially with each other, and the inner and outer walls 58 and 60 are projected to the outside of the leg plate 18.

Also, the guide plate 52 is formed with a circular hole 62 at a position eccentric to the boss portion 56 and an end portion of the takeup shaft 22 is inserted in the circular hole (not shown). Fixed to the end portion of the takeup shaft 22 coaxially therewith is a pinion 64 which is rotated together with the takeup shaft 22.

In addition, a part of the guide plate 52 is elongated as an elongated portion 66 up to a position opposed to the force-receiving plate 48 of the pawl 30 and a pin 68 is fixed to the elongated portion 66.

Figure 4:
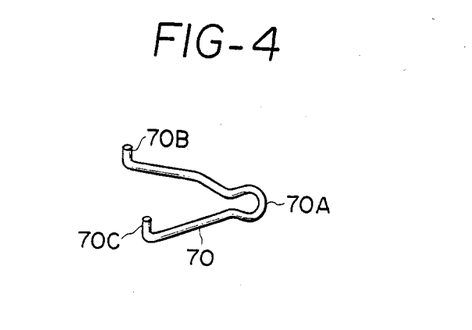
FIG. 4 is a perspective view showing a wire spring.

The pin 68 is engaged with an intermediate arc portion 70A of a wire spring 70 formed in a substantial V-shape as is a transmitting means, as shown in FIG. 4, and the wire spring 70 is rotatable about the pin 68. The wire spring 70 is formed at both the end portions thereof with bent portions 70B, 70C bent at a right angle and the bent portion 70B is opposed to the force-receiving plate 48 of the pawl 30. Accordingly, when the wire spring 70 is rotated in the clockwise direction about the pin 68 on FIG. 3, the bent portion 70B can rotate the pawl 30 in the counterclockwise direction on FIG. 3 to cause it to mesh with the ratchet wheels 28.

The control mechanism 50 is provided with a cam ring 72, as shown in detail in FIGS. 5 through 8. The cam ring 72 is of a disk and is formed at its axial center portion with a circular hole 74 mating with the boss portion 56 of the guide plate 52 shown in FIG. 3. The cam ring 72 is formed with an outer ring 76 projected from the outer periphery thereof in the same direction as the center axis of the cam ring 72 and the outer ring 76 is inserted between the inner wall 58 and the outer wall 60 of the guide plate 52 shown in FIG. 3 to contact with an inner periphery of the outer wall 60. Additionally, the cam ring 72 is also formed with an inner ring 78 projected coaxially with the outer ring 76 in an amount of more than the projected amount of the outer ring 76. The inner ring 78 is arranged in such a manner that its inner periphery is caused to contact with the outer periphery of the inner wall 58 of the guide plate 52, and an internal gear 80 formed on the inside of the inner ring 78 comes into mesh with the pinion 64 shown in FIG. 3. Therefore, the rotation of the takeup shaft 22 is subjected to reduction to be transmitted to the cam ring 72, and the cam ring 72 is rotated in the clockwise direction of FIG. 5 (in a direction of arrow C) when the takeup shaft 22 is rotated in the webbing-winding direction (in a direction of arrow A), it being rotated in the counterclockwise direction of FIG. 5 (in a direction of arrow D) when the takeup shaft 22 is rotated in the webbing-unwinding direction (in a direction of arrow B).

A groove portion 82 formed between the inner ring 78 and the outer ring 76 of the cam ring 72 is opposed to the bent portion 70C of the wire spring 70 shown in FIG. 3. Also, the outer ring 76 of the cam ring 72 is formed with an inlet portion 84 and an outlet portion 86 as are notched portions in which the groove portion 82 and the outer periphery of the cam ring 72 are interconnected. In consequence, the bent portion 70C can be led from the outer periphery of the outer ring 76 to the groove portion 82 through the inlet portion 84 and it can also be led from the groove portion 82 to the outer periphery of the outer ring 76 through the outlet portion 86 (refer to arrows E and F in FIG. 5). Thus, the groove portion 82 functions as a first guide portion for putting the ratchet wheels 28 and the pawl 30 in mesh with each other and the outer periphery portion of the outer ring 76 functions as a second guide portion causing the pawl 30 to mesh with the ratchet wheels 28.

Figure 5:
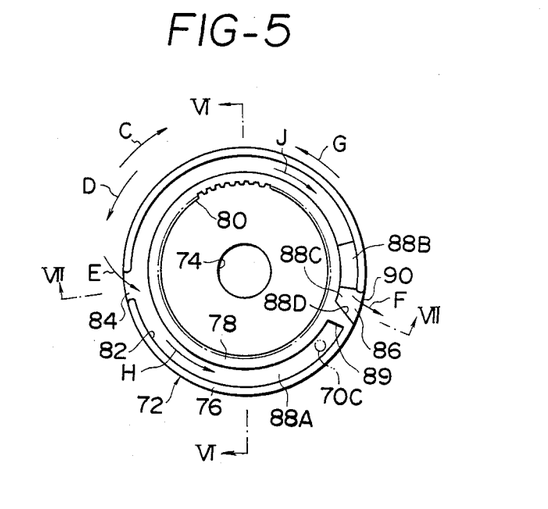
FIG. 5 is a front view showing a cam ring.
Figure 6:
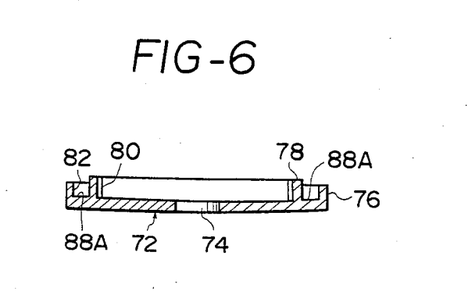
FIG. 6 is a sectional view taken along a line VI—VI of FIG. 5.

The groove portion 82 of the cam ring 72 has a bottom face 88A of a constant depth except the vicinity of the outlet portion 86 and is formed at its one end with a detent wall 89. When the bent portion 70C led from the inlet portion 84 is moved by the rotation of the cam ring 72 in the direction of arrow C, the movement of the bent portion 70C is stopped at the detent wall 89. The bottom face 88A is connected to a slope face 88B at the opposite side of the detent wall 89. The slope face 88B gradually rises to connect with a flat face 88C contacting with the outer periphery of the cam ring 72 through the outlet portion 86. Accordingly, the outer periphery of the cam ring 72 contacting with the outlet portion 86 forms a step portion 90 relative to the bottom face 88A, whereby the bent portion 70C is prevented from returning from the outer periphery of the cam ring 72 back to the outlet portion 86.

In this connection, a portion of a side face of the flat face 88C forms a guide face 88D having a slope to a radial direction of the cam ring 72, so that the bent portion 70C is smoothly led to the outlet portion 86.

Figure 7:
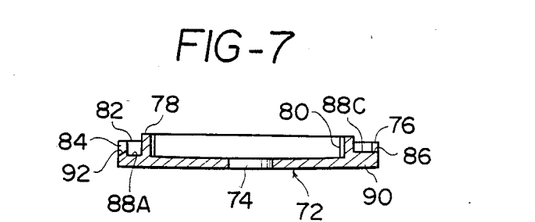
FIG. 7 is a sectional view taken along a line VII—VII of FIG. 5.
Figure 8:
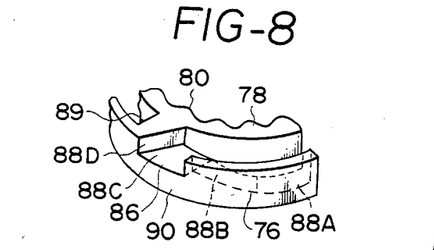
FIG. 8 is a perspective view of a leading-out portion.
Figure 9:
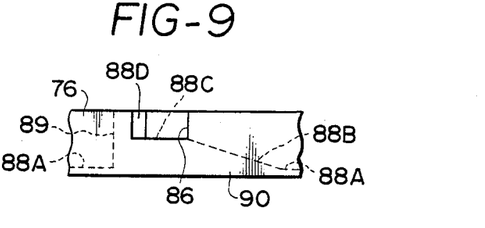
FIG. 9 is a side view of the leading-out portion of FIG. 8.

Regarding a boundary face between the bottom face 88A and the inlet portion 84, the bottom face 92 of the inlet portion 84 is formed higher than the bottom face 88A and has a slope rising gradually from the outer periphery of the outer ring 76 to the bottom face 88A, as shown in FIG. 7.

In consequence, when the cam ring 72 is rotated in the direction of arrow C shown in FIG. 5, the bent portion 70C of the wire spring 70 is led to the groove portion 82 through the inlet portion 84, as shown by an arrow E, and it arrives at the detent wall 89. In addition, when the cam ring 72 is rotated in the direction of arrow D, the bent portion 70C is moved along the groove portion 82 in the direction of arrow J and it is led from the bottom face 88A to the outside of the outer ring 76 through the slope face 88B and the flat face 88C, as shown by an arrow F. Also, the bent portion 70C led from the groove portion 82 to the outer periphery of the outer ring 76, as shown by the arrow F of FIG. 5, is moved along the outer periphery of the outer ring 76 to the inlet portion 84 in the direction of arrow G and is led to the groove portion 82 through the inlet portion 84, again, as shown by the arrow E, when the cam ring 72 is rotated in the direction of arrow C, i.e. in the webbing-winding direction of the takeup shaft 22.

In case that the bent portion 70C is positioned in the groove portion 82, the bent portion 70B as is the outer end of the wire spring 70 is caused to contact slightly with the force-receiving plate 48 or to seprate somewhat therefrom. When the bent portion 70C reaches the outer periphery of the outer ring 76, it is moved in a direction of the bent portion 70B, whereby the bent portion 70B biases the pawl 30 rotatably to come into mesh wish the ratchet wheels 28. Thus, the automatic locking mechanism is worked in the webbing retractor 10.

For the purpose of that the bent portion 70C is worked surely, the bent portion 70C of the wire spring 70 is biased in the direction of the bottom face 88A of the groove portion 82 of the cam ring 72, namely, in the direction of separation from the leg plate 18, and the position of the bent portion 70C relative to the pawl 30 is defined in such a manner that the bent portion 70C is moved in the direction of arrow E by the biasing force of the wire spring 70 to be led to the groove portion 82 when the bent portion 70C reaches the inlet portion 84. Also, after the bent portion 70C is led into the groove portion 82, the wire spring 70 is put in its released situation, so that the biasing force of the wire spring 70 does not act on the pawl 30.

The assembled position of the cam ring 72 relative to the takeup shaft 22 is defined in such a manner that the bent portion 70C is positioned close to the detent wall 89 on the bottom face 88A when the webbing 24 is wound, or retracted, on to the takeup shaft 22 in a maximum amount and it reaches the outer periphery of the cam ring 72 from the flat face 88C through the step portion 90 when the webbing 24 is unwound in a predetermined amount of more than the length of the webbing 24 worn by the occupant.

After the cam ring 72 is mounted on the boss portion 56 of the guide plate 52 through the circular hole 74, a dust cover 93 concealing the cam ring 72 is mounted on to the outside of the leg plate 18 and a bolt 94 is screwed to the boss portion 56 through the dust cover 93, whereby the dust cover 93 is fixed to the leg plate 18.

Description will now be given of operation of the first embodiment according to the present invention.

When the webbing 24 is not worn yet by the occupant, the major part of the webbing 24 is wound on to the takeup shaft 22 and the bent portion 70C of the wire spring 70 is positioned on the bottom face 88A of the cam ring 72 close to the detent wall 89, as shown in FIG. 5. Accordingly, since the bent portion 70B of the wire spring 70 does not give the biasing force to the pawl 30, the pawl 30 is separated from the ratchet wheels 28 due to the biasing force of the wire spring 34 and the takeup shaft 22 is kept rotatable in the webbing-unwinding direction.

When the occupant grasps the webbing 24 to unwind it from the takeup shaft 22, the cam ring 72 rotated through the pinion 64 and the internal gear 80 is moved in the direction of arrow D, so that the bent portion 70C reaches the slope face 88B from the bottom face 88A. However, the cam ring 72 is not rotated while the bent portion 70C reaches the slope face 88B by the webbing-wearing operation of the occupant, that is to say, the bent portion 70C does not miss from the bottom face 88A in an ordinary webbing-wearing operation of the occupant.

Accordingly, the occupant can wear the webbing by his ordinary webbing-wearing operation and can put his vehicle in an ordinary running situation of the vehicle.

In the running situation of the vehicle, the takeup shaft 22 is put in its rotatable condition, so that the occupant can freely move in his driving position.

Additionally, when the vehicle falls in such an emergency situation as a collision, the pendulum 42 as is an acceleration sensor is inclined to cause the pawl 30 to come into mesh with the ratchet wheels 28 through the lever 38, whereby the webbing-unwinding rotation of the takeup shaft 22 is suddenly stopped and the occupant is restrained surely by the webbing 24. That is to say, in the ordinary running situation of the vehicle the occupant is not largely pressed by the webbing 24 but in the emergency situation thereof the occupant can be restrained surely by the webbing 24.

Next, when a fixture such as a child seat or the like on a seat of the vehicle is restrained by the webbing 24, it, the fixture, may be moved due to a low acceleration range where the pendulum 42 is not worked.

In this case, if the occupant unwinds the webbing 24 from the takeup shaft 22 largely, for example in a substantially whole amount of the webbing 24, the cam ring 72 is rotated in the direction of arrow D, so that the bent portion 70C is moved from the bottom face 88A to the outside of the outer periphery of the cam ring 72 through the slope face 88B, the flat face 88C and the outlet portion 86. As a result, the wire spring 70 rotates the pawl 30 to cause it to come into mesh with the ratchet wheels 28.

Thus, the condition that the bent portion 70C reaches the outside of the outer ring 76 shows the condition that the automatic locking mechanism is worked in the webbing retractor 10 where the takeup shaft 22 is rotatable in the webbing-winding direction but is prevented from rotation in the webbing-unwinding direction. Accordingly, the fixture can firmly be restrained by the webbing 24 without being affected by the acceleration of the vehicle.

In addition, when the restraint of the fixture or the like is released and the webbing 24 is wound on to the takeup shaft 22, the bent portion 70C reaching the inlet portion 84 owing to the rotation of the cam ring 72 in the direction of arrow C is led again to the groove portion 82 through the inlet portion 84 due to the reaction force acting upon the bent portion 70B by the pawl 30 and, therefore, the webbing retractor 10 is returned back to the condition that the emergency locking mechanism is worked.

Figure 10:
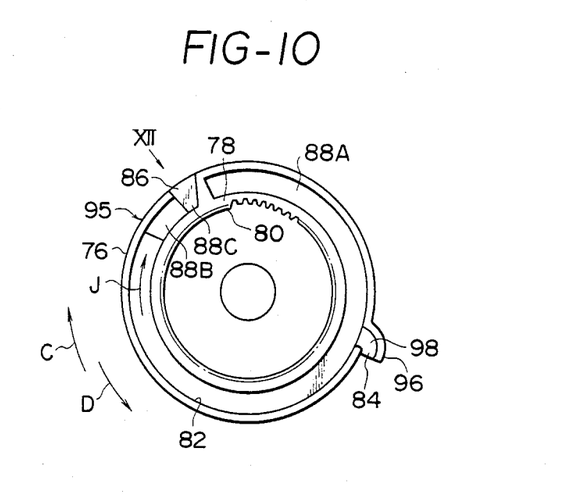
FIG. 10 is a front view showing a cam ring used in a second embodiment according to the present invention.
Figure 11:
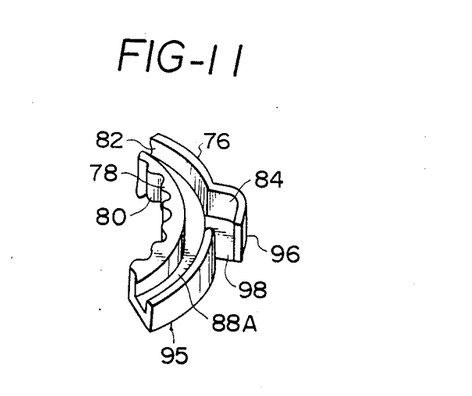
FIG. 11 is a partial perspective view showing an introducing portion of FIG. 10.

Next, FIGS. 10 and 11 shows a cam ring 95 used in a second embodiment according to the present invention. The cam ring 95 is formed with the inner and outer rings 78 and 76 and the internal gear 80 as well as the above-described first embodiment but it is different in shape close to the inlet portion 84 therefrom.

In the second embodiment the inlet portion 84 is provided with a guide 96 leading in a direction of the axial center of the cam ring 95 the bent portion 70C moved relative to the cam ring 95 in the direction of arrow D and is formed with a slope bottom face 98 lifting the tip end of the bent portion 70C and leading it to the bottom face 88A.

Except the above-described construction the second embodiment has the same construction as the first embodiment and, therefore, the former has the substantially same functions as the latter.

We claim:

1. A webbing retractor used in a seatbelt system for protecting an occupant in an emergency situation of a vehicle, which comprises:
   (a) a takeup shaft for retracting an occupant-restraining webbing;
   (b) a locking means moveable to a locked position for preventing takeup shaft webbing-unwinding rotation and to an unlocked position
   (c) an acceleration sensor operable to move said locking means to locked position in an emergency situation of the vehicle;
   (d) a transmitting means for biasing the locking means to locked position;
   (e) a cam ring rotated relative to the transmitting means by rotation of the takeup shaft;
   (f) a first guide portion formed in the cam ring and moving the locking means to locked position independently of the transmitting means bias until the webbing is unwound up to a first predetermined amount;
   (g) a second guide portion formed in the cam ring and biasing the locking means to locked position through the transmitting means;
   (h) an outlet portion formed in the cam ring and opposing the transmitting means from the first guide portion to the second guide portion when the webbing is unwound in an amount more than the first predetermined amount; and
   (i) an inlet portion formed in the cam ring and returning the transmitting means to the first guide portion to put the locking means in locked position when the webbing is retracted on to the takeup shaft a second predetermined amount; whereby the webbing is free to unwind in an ordinary driving condition of the occupant normally wearing the webbing and the webbing is prevented from being unwound when the webbing is unwound in the first predetermined amount or more.

2. A webbing retractor as set forth in claim 1, wherein at least one of the first and second guide portions is an arc groove.

3. A webbing retractor as set forth in claim 2, wherein at least one of the first and second guide portions is formed at the outside of the cam ring.

4. A webbing retractor as set forth in claim 2, wherein the rotation of the takeup shaft is transmitted to the cam ring with a speed reducing means.

5. A webbing retractor as set forth in claim 4, wherein the cam ring is formed with an internal gear to which the rotation of the takeup shaft is transmitted.

6. A webbing retractor as set forth in claim 2, wherein at least one of the first and second guide portions is a groove, a part of the transmitting means is biased in the direction of the bottom of the groove to be opposed to the groove, and the outlet portion leads the portion of the transmitting means positioned in the first guide portion to the second guide portion.

7. A webbing retractor as set forth in claim 6, wherein the outlet portion is formed with a guide face of wall shape and is inclined at an angle to a radial line of the cam ring and leading a part of the transmitting means to the second guide portion.

8. A webbing retractor as set forth in claim 2, wherein the first guide portion is formed in the inside of the second guide portion.

9. A webbing retractor as set forth in claim 2, wherein the outer periphery of the cam ring constitutes the second guide portion and the first guide portion is formed coaxially with the second guide portion.

10. A webbing retractor as set forth in claim 9, wherein a part of the transmitting means is biased in the direction of the axial center of the cam ring so as to be led from the second guide portion into the first guide portion through the inlet portion.

11. A webbing retractor as set forth in claim 10, wherein a step portion is formed between the outlet portion and the second guide portion, whereby a part of the transmitting means is not returned back to the first guide portion from the second guide portion through the outlet portion.

12. A webbing retractor as set forth in claim 10, wherein the inlet portion is formed with a slope bottom face leading for directing the part of the transmitting means to the first guide portion.

13. A webbing retractor as set forth in claim 12, wherein the inlet portion is formed with a guide portion leading the transmitting means in the direction of the axial center of the cam ring.

14. A webbing retractor as set forth in claim 1, wherein the transmitting means is a wire spring, one end of which is opposed to the cam ring, the other end thereof being opposed to the locking means.

15. A webbing retractor as set forth in claim 14, wherein a center portion of the wire spring is supported to a frame supporting the takeup shaft.

16. A webbing retractor as set forth in claim 14, wherein the wire spring is formed at one end thereof with a bent portion which is the part inserted in the first and second guide portions.

17. A webbing retractor as set forth in claim 16, wherein the locking means consists substantially of at least one ratchet wheel fixed to the takeup shaft and a pawl engageable therewith, and the one end of the wire spring contacts with the pawl to urge the pawl to engage with the ratchet wheel.

18. A webbing retractor, which comprises:
   (a) a frame fixed to a vehicle body;
   (b) a takeup shaft rotatably supported to the frae an winding an occupant-restraining webbing thereto;

(c) a locking means for stopping an unwinding rotation of the takeup shaft; and (d) a cam ring, rotatable by rotation of the takeup shaft, the cam ring being formed with a guide means which does not operate the locking means when the webbing is unwound by an amount of a wearing length of an occupant and operates the locking means when the webbing is unwound in an amount of more than the wearing length, whereby when the occupant wears the webbing and the vehicle is put in an ordinary running situation the webbing retractor functions as an emergency locking retractor, and when the webbing is unwound more than said wearing length the webbing retractor functions as an automatic locking retractor.

19. A webbing retractor as set forth in claim 18, wherein the guide means consists substantially of a pair of guide portions formed coaxially with each other on the cam ring, a transmitting means, a part thereof is guided in the guide portions to thereby operate the locking means, and inlet and outlet protions formed respectively at boundary portions of the pair of guide portions and preventing the part of the transmitting means from returning reversely from one of the guide portions back to the other of the guide portions.

20. A webbing retractor winding a webbing worn by an occupant riding on a vehicle, which comprises:

(a) a takeup shaft for retracting the webbing;

(b) a frame fixed to the vehicle body and rotatably supporting the takeup shaft;

(c) at least one ratchet wheel fixed to the takeup shaft;

(d) a pawl rotatably supported to the frame and engageable with the ratchet wheel;

(e) an acceleration sensor causing the pawl to engage with the ratchet wheel to stop an webbing-unwinding rotation of the takeup shaft;

(f) a cam ring, rotatable by rotation of the takeup shaft;

(g) a first guide portion of an arc groove on the cam ring;

(h) a second guide portion formed of the outer periphery of the cam ring;

(i) a transmitting means having two ends supported to the frame, one end thereof being opposed to the pawl and the other end thereof being opposed to one of the first and second guide portions, and the other end being positioned in the first guide portion so that the one end does not urge the pawl into engagement with the ratchet wheel until the webbing is unwound a predetermined amount and the other end being positioned in the second guide portion so that the said one end causes the pawl to come into mesh with the ratchet wheel when the webbing is unwound in an amount of more than the predetermined amount; and (j) a boundary means disposed such as to first direct the one end of the transmitting means to the first guide portion and then to the second guide portion.

* * * * *